(12) United States Patent
Teraoka et al.

(10) Patent No.: US 7,746,852 B2
(45) Date of Patent: Jun. 29, 2010

(54) PACKET DATA SERVING NODE AND COMMUNICATION METHOD USING THE SAME

(75) Inventors: Hitomi Teraoka, Yokohama (JP); Naruhito Nakahara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 311 days.

(21) Appl. No.: 10/593,348

(22) PCT Filed: Feb. 25, 2005

(86) PCT No.: PCT/JP2005/003182
§ 371 (c)(1),
(2), (4) Date: Sep. 19, 2006

(87) PCT Pub. No.: WO2005/091575
PCT Pub. Date: Sep. 29, 2005

(65) Prior Publication Data
US 2007/0195758 A1 Aug. 23, 2007

(30) Foreign Application Priority Data
Mar. 19, 2004 (JP) .............................. 2004-079452

(51) Int. Cl.
*H04L 12/28* (2006.01)
(52) U.S. Cl. .................. 370/389; 370/252; 370/328; 370/352; 370/392; 370/469
(58) Field of Classification Search .......... 370/252–255, 370/328, 329, 348, 352, 289, 392, 469
See application file for complete search history.

(56) References Cited
U.S. PATENT DOCUMENTS
6,230,012 B1 * 5/2001 Willkie et al. ............ 455/435.1

6,370,118 B1 * 4/2002 Lioy et al. .................. 370/235

(Continued)

FOREIGN PATENT DOCUMENTS
JP 11-136396 5/1999

(Continued)

OTHER PUBLICATIONS

3GPP2 X.S0011-002-C cdma2000 Wireless IP network Standard: Simple IP and Mobile IP Access Services, Version 1.0.0, Aug. 2003.

*Primary Examiner*—Ayaz R Sheikh
*Assistant Examiner*—Andrew C Lee
(74) *Attorney, Agent, or Firm*—Antonelli, Terry, Stout & Kraus, LLP.

(57) ABSTRACT

A communication system using PPP in which a plurality of layer 3 protocols are defined has a problem. PDSN cannot judge which of layer 3 protocols is equipped in a terminal, and NCP phase processes corresponding to all layer 3 protocols of the system are executed. This increases the number of PPP packets transmitted/received between the terminal and PDSN, which prolongs a connection time. In the invention, a new procedure of the NCP phase process is established in a communication system, by which the terminal firstly notifies a layer 3 protocol to PDSN and thereafter the NCP phase process is executed. PDSN waits for a notice of the layer 3 protocol from the terminal, selects the corresponding layer 3 protocol from the layer 3 protocols according to the notice, and executes the NCP phase.

7 Claims, 8 Drawing Sheets

U.S. PATENT DOCUMENTS

| | | | |
|---|---|---|---|
| 6,414,950 B1 * | 7/2002 | Rai et al. | 370/338 |
| 6,483,822 B1 * | 11/2002 | Lioy et al. | 370/329 |
| 6,487,218 B1 * | 11/2002 | Ludwig et al. | 370/469 |
| 6,628,671 B1 * | 9/2003 | Dynarski et al. | 370/469 |
| 6,775,553 B1 * | 8/2004 | Lioy | 455/461 |
| 6,785,823 B1 * | 8/2004 | Abrol et al. | 726/7 |
| 6,909,714 B2 * | 6/2005 | Abrol et al. | 370/389 |
| 6,947,406 B2 * | 9/2005 | Ramji | 370/338 |
| 6,961,348 B2 * | 11/2005 | Yu | 370/466 |
| 6,973,088 B2 * | 12/2005 | Kuzhiyil et al. | 370/395.2 |
| 7,260,107 B1 * | 8/2007 | Sasaki et al. | 370/466 |
| 7,342,894 B2 * | 3/2008 | Abrol et al. | 370/254 |
| 7,363,534 B1 * | 4/2008 | Krishnamurthy et al. | 714/13 |
| 7,369,533 B1 * | 5/2008 | Raman | 370/349 |
| 7,403,498 B2 * | 7/2008 | Abrol et al. | 370/324 |
| 2002/0046280 A1 * | 4/2002 | Fujita | 709/227 |
| 2002/0145993 A1 * | 10/2002 | Chowdhury et al. | 370/338 |
| 2003/0093540 A1 * | 5/2003 | Lioy | 709/230 |
| 2003/0172143 A1 * | 9/2003 | Wakayama | 709/223 |
| 2003/0224757 A1 * | 12/2003 | Dyck et al. | 455/411 |
| 2004/0008728 A1 * | 1/2004 | Lee | 370/474 |
| 2004/0148427 A1 * | 7/2004 | Nakhjiri et al. | 709/237 |
| 2004/0167978 A1 * | 8/2004 | Kitayama | 709/224 |
| 2004/0223506 A1 * | 11/2004 | Sato | 370/428 |
| 2004/0252717 A1 * | 12/2004 | Solomon et al. | 370/466 |
| 2005/0021770 A1 * | 1/2005 | Helm et al. | 709/228 |
| 2007/0242698 A1 * | 10/2007 | Sumida | 370/469 |
| 2008/0151784 A1 * | 6/2008 | Abrol et al. | 370/254 |
| 2009/0040988 A1 * | 2/2009 | Mir et al. | 370/338 |

FOREIGN PATENT DOCUMENTS

| | | |
|---|---|---|
| JP | 2001-086156 | 3/2001 |
| JP | 2001-320543 | 11/2001 |
| JP | 2001-333132 | 11/2001 |
| JP | 2004-363993 | 12/2004 |
| WO | WO 2005/081471 | 9/2005 |

* cited by examiner

PACKET DATA SERVING NODE AND COMMUNICATION METHOD USING THE SAME

INCORPORATION BY REFERENCE

The Present Application Relates to International Application No. PCT/JP2005/2811 filed on Feb. 22, 2005 which was filed based on Japanese Patent Application No. 2004-048952 filed on Feb. 25, 2004, the contents of which are incorporated herein by reference.

The present application claims for priority of Japanese Patent Application No. 2004-079452 filed on Mar. 19, 2004, the contents of which are incorporated herein by reference.

TECHNICAL FIELD

The present invention relates to the structure of a packet data serving node to be used for a packet communication system such as mobile communication utilizing Point to Point Protocol (PPP) and a communication method for the communication system using the packet data serving node.

BACKGROUND ART

In a mobile communication, data communication such as transmission/reception of mails using a mobile station and accesses to the Internet is performed between the mobile station and a contents server as an access destination, by using Internet Protocol (hereinafter called IP) packets. In order to realize such data communication, it is known that IP packet communication is performed between a mobile station and a packet data serving node (hereinafter called PDSN (Packet Data Serving Node)) by using Point to Point Protocol (hereinafter called PPP) standardized by RFC1661 (refer to 3GPP2 X. S0011-C cdma2000 Wireless IP network Standard).

PPP is used for data communication between devices directly interconnected by a WAN line such as dial-up connection and ISDN and between a mobile radio station and a PDSN in a mobile communication system. The status of each device is set by transmission/reception of user authentication, protocols, addresses, a compression and error correction method and the like to be used, between devices by using various PPP packets prescribed in RFC1661, to thereby allow data transfer using not only IP packets but also various protocols. When a mobile station sends an IP packet to a contents server, the mobile station generates a PPP packet by adding a PPP header to the IP packet to transmit data to PDSN via a provider network. PDSN removes the PPP header of the PPP packet to extract the IP packet, and thereafter transfers the IP packet to an access destination contents server via a public network.

Fundamental operations regarding PPP connection/disconnection between a communication terminal device and PDSN include a link establishment phase, a user authentication phase, a network-layer protocol phase and a link termination phase. The link establishment (hereinafter called Link Control Protocol (LCP)) phase establishes a data link by using LCP when a physical line connection is completed, and decides a data size, presence/absence of compression, a rate and the like. The user authentication phase performs user authentication such as permission/rejection of a partner access authority. The network-layer protocol (hereinafter called Network Control Protocol (NCP)) phase is a phase for selecting an upper protocol and setting network address assignment by using NCP to release a network. The link termination phase is a phase for terminating a PPP link by using LCP.

More detailed description will be made. PPP is constituted of two protocols: LCP and NCP. LCP is a protocol for controlling link establishment and user authentication in a physical line connection state. NCP is a protocol for assigning addresses determined by a layer 3 protocol (network layer protocol), and has a function of assigning, for example, an IP address if the network layer uses IP. NCP designates a type of a layer 3 protocol in a protocol field of an NCP packet (one kind of a PPP packet) to thereby decide which one of a plurality of layer 3 protocols is to be used. For example, if IPv4 is to be used which is prescribed in RFC791 (Internet Protocol), 8021 in hexadecimal notation is set to the protocol field. IPv4 stipulates a selection of a route for sending, to a transfer partner, a data packet (data such as File Transfer Protocol (FTP) for file transfer and Transmission Control Protocol (TCP) for high reliability communication). With this route selection, IP addresses of a 32-bit numerical number are used, so that about four billion and two hundred million addresses can be distinguished at a maximum. If IPv6 is to be used which is prescribed in RFC2460 (Internet Protocol, Version 6), 8057 in hexadecimal notation is set to the protocol field. IPv6 can distinguish an IP address from a 128-bit numerical number. This protocol has been developed due to grave misgivings about exhaustion of address resources to be caused by recent rapid spread of the Internet, and is expected to be applied to future Internet communication.

As prescribed in RFC1661 for PPP connection operation between a terminal and PDSN, the LCP phase is first executed, and if a data link is established, an authentication process is executed in the authentication phase. After the authentication is completed, the NCP phase is effected for decision of a protocol to be used, selection (designation) of an IP address and the like.

In a communication system in which PDSN is equipped with both IPv4 and IPv6 protocols and a terminal is equipped with only an IPv6 protocol, the NCP phase is effected after the LCP phase process and authentication process are completed between a mobile station and PDSN. According to the prescription of RFC1661, the NCP phase is effected for all protocols equipped in PDSN. This operation is performed in the following manner.

Although the terminal is equipped with only the IPv6 protocol, PDSN is equipped with both the IPv4 and IPv6 protocols. Therefore, PDSN executes the NCP phase for both the protocols and transmits an IPCP Configure Request packet for IPv4 and an IPv6CP Configure Request packet for IPv6, to the terminal. The terminal returns an LCP Protocol Reject packet representative of non-equipment in response to the received IPCP Configure Request Packet. Since the terminal is equipped with the IPv6 protocol, the terminal transmits an IPv6CP Configure Request packet to PDSN in parallel to the operation of PDSN.

Upon reception of the LCP Protocol Reject packet from the terminal, PDSN decides termination of the NCP phase for IPv4 and terminates NCP negotiation for the rejected protocol. In response to the IPv6CP Configure Request packet received from the terminal, PDSN transmits an IPv6CP Configure Ack packet representative of connection permission, to the terminal. When this packet is received, connection preparation at the terminal is completed. When the IPv6CP Configure Ack packet representative of connection permission is received from the terminal in response to the IPv6CP Configure Request packet transmitted from PDSN, connection preparation at PDSN is also completed. In this manner, PPP connection allowing IPv6 network communication is completed.

As described above, in the connection operation via a network using PPP, a terminal requiring connection issues a call to PDSN to effect negotiation for connection establishment and user authentication under LCP, as disclosed in RFC1661. Thereafter, PDSN establishes PPP connection under NCP by negotiations with types of all protocols equipped in PDSN.

DISCLOSURE OF THE INVENTION

Problem to be Solved by the Invention

For a communication system using PPP, a plurality of layer 3 protocols are prescribed. In the NCP phase which is one of PPP connection phases, the NCP phase process is executed for each protocol. More specifically, in a communication system required to support a plurality of layer 3 protocols, PDSN cannot judge which layer 3 protocol is equipped in a terminal, so that the NCP phase process is required to be executed for all layer 3 protocols running in the system. Only the layer 3 protocol supported by the terminal succeeds the NCP phase process, and the packet communication using PPP is permitted.

Namely, in a conventional NCP phase process, PDSN executes the NCP phase process also for the layer 3 protocol not equipped in the terminal, so that the number of PPP packets (the number of sequences) to be transmitted/received between the terminal and PDSN increases and a PPP connection time is prolonged correspondingly. In a mobile communication system in particular, handover is often performed wherein connection/disconnection (re-connection) frequently occurs at a short time interval, because as a terminal moves, a connection destination PDSN changes. It is therefore desired that a connection time is as short as possible. There is also a possibility that a connection inability time exists because of a long PPP connection time.

An object of the present invention is to eliminate the above-described disadvantages of conventional technologies and provide a communication system using PPP capable of shortening a PPP connection time between a terminal and PDSN, and a PDSN device applied to the communication system.

Means for Solving the Problem

In a mobile communication system, various terminals request connections from various locations while the terminals move. Therefore, in the processes such as protocol selection in the NCP phase to be executed by a communication system using PPP, a PDSN side cannot distinguish the layer 3 protocol of a terminal requesting a connection process. Therefore, the NCP phase process is executed for all protocols having a possibility of being used at terminals, and a protocol is decided in accordance with a response from the terminal to continue the NCP phase process.

A layer 3 protocol is predetermined in many terminals such as a terminal using IPv4 and a terminal using IPv6. Even a terminal having a dual stack configuration of IPv4 and IPv6 starts communication after one of the protocols is selected. Attention has been paid to the fact that each terminal side has a predetermined layer 3 protocol to be used for the NCP phase process. Conventionally, a layer 3 protocol has been decided from the request (inquiry) results made first by PDSN for all protocols. According to the present invention, the sequence of the NCP phase process of a communication system is newly set in such a manner that a terminal first notifies its layer 3 protocol to PDSN. As the NCP phase starts, a predetermined layer 3 protocol is notified. PDSN waits for a notice of the predetermined layer 3 protocol from the terminal, and in accordance with this notice, selects the predetermined layer 3 protocol from a plurality of protocols equipped in PDSN.

Specifically, a packet data serving node for connecting a communication terminal device to a public network by using PPP comprises: LCP phase processing means; NCP phase processing means; decision means for deciding a type of a reception PPP packet; and control means for making the NCP phase processing means transmit an NCP start request message destined to the communication terminal device, after an LCP phase is completed and the decision means receives an NCP start request message from the communication terminal device.

A plurality of NCP phase processing means may be provided as many types as communication terminal devices may use, and the NCP phase processing means for the layer 3 protocol actually used by the communication terminal device is selected from the type of a reception PPP packet and then operated. Alternatively, the layer 3 protocol actually used by the communication terminal device may be set to the NCP phase processing means.

ADVANTAGES OF THE INVENTION

In a communication system using PPP between PDSN and communication terminal devices, the number of PPP packets to be transmitted/received can be reduced and a PPP connection time can be shortened. In a mobile communication system, even if handover occurs which necessitates PPP re-connection due to a change in a connection destination caused by a motion of a terminal, a PPP connection time can be shortened so that a communication inability time can be shortened.

Since the number of sequences for PPP connection is reduced, radio resources of the mobile communication system can be made efficient.

Other objects, features and advantages of the present invention will become apparent from the following description of embodiments of the present invention when read in conjunction with the accompanying drawings.

BEST MODE FOR CARRYING OUT THE INVENTION

In the following, with reference to the accompanying drawings, detailed description will be made on a communication terminal device, a packet data serving node, and a communication method for a communication system using these devices and nodes according to the present invention, by taking as an example, IPv4 and IPv6 packet communications in a configured mobile communication system.

FIG. 1 is a network configuration diagram showing an example of the configuration of a mobile communication system using communication terminal devices and packet data serving nodes (PDSN) according to the present invention. The mobile communication system is constituted of: mobile stations 100, 150 and 160; a base station 400 to be connected to the mobile stations via radio links; a PDSN 200 which is a communication connection device for connecting the mobile station 100 via a provider network 500 under PPP; a public IPv4 network 501; and a public IPv6 network 502. The terminals 100, 150 and 160 perform connection operations using PPP relative to PDSN 200. After the connection operations are completed, an IP packet is encapsulated in a PPP packet to transfer data to PDSN 200 via the provider network 500. PDSN 200 extracts the IP packet from the PPP packet, and transmits the IP packet to a contents server or the like provided by an unrepresented service provider or the like via the public network 501 or 502. In this manner, data communication such as e-mail transmission/reception and access to the Internet is performed by using IP packets. The mobile stations include the terminal 150 to be connected to the public IPv4 network by using IPv4 communication, the terminal 100 to be connected to the public IPv6 by using IPv6 communication, and the mobile station 160 provided with both IPv4 and IPv6 communication functions, these mobile stations mixedly existing in the system.

When PPP packets are transferred via the provider network, encapsulating is generally performed by using; HDLC-like-framing having an architecture equivalent to High-Level Data Link Control (hereinafter called HDLC) framing prescribed in RFC1662 (PPP in HDLC-like Framing); PPP over Ethernet (hereinafter called PPPoE) prescribed in RFC2516A (A Method for Transmitting PPP Over Ethernet), Ethernet™; or the like, which have advantages capable of strict error control by Cyclic Redundancy Check (CRC) and distinguishment among a plurality of protocols. In this embodiment, it is assumed that PPP packets to be transmitted/received between the mobile station and PDSN 200 are encapsulated in a frame and then transferred. In the following description, the entirety of an encapsulated PPP packet is called a PPP frame.

Although a radio terminal has been described illustratively as the terminal, the present invention is also applicable to a lined terminal. In this case, PDSN is generally called an access server, and PPP connection becomes possible between lined terminals and access servers by the processes similar to those described above.

FIG. 2 is a diagram showing an example of a functional structure of the mobile station. In FIG. 2, although the structure of the terminal 100 using IPv6 is shown illustratively, similar structures are applied to the terminal 150 using IPv4 and the terminal 160 having a dual stack structure using both IPv4 and IPv6. In this case, setting data and operation programs to be described later change with each layer 3 protocol.

The radio terminal 100 is constituted of: a radio processing unit 104 for performing radio session communication with the base station 400; a PPP processing unit 110 for executing a connection/disconnection process using PPP relative to PDSN 200; an IP processing unit 102 for processing an IP packet transferred from the PPP processing unit 110; and an application processing unit 101 for processing an application.

The PPP processing unit 110 is constituted of: a data reception unit 111 for receiving a PPP frame from the radio processing unit 104; a capsule development unit 112 for removing a data link capsule (e.g., a header/footer of HDLC-like framing) from a received PPP frame to extract data (PPP packet); a protocol decision unit 113 for transferring a PPP packet to each phase in accordance with the protocol decided from a protocol field of the PPP packet extracted from a capsule; an LCP phase unit 114 for performing an LCP process and an authentication process; an NCP phase unit 115 for executing an NCP phase; a scheduling unit 120 for managing operation timings of each phase processing unit; an encapsulating unit 116 for encapsulating a PPP packet received from each phase unit into a PPP frame of HDLC-like framing; and a data transmission unit 117 for transmitting an encapsulated PPP frame to the radio processing unit 104. In this embodiment, although the LCP process and authentication process are executed collectively by the LCP phase unit 114 because these processes are executed sequentially, these processes may be assigned to different phase units.

Each functional block such as the PPP processing unit 110, IP processing unit 102 and application processing unit 101 is realized by an unrepresented processor (CPU) and software stored in a memory or the like. Some functions may be realized by hardware. In either case, a predetermined layer 3 protocol (IPv6 for the terminal 100) is set to each functional block which is driven by CPU and hardware to perform a device operation using PPP, such as a connection control. In the case of the terminal 100, the NCP phase unit 115 transmits/receives an NCP packet indicating an operation under IPv6 designated by setting 8057 in hexadecimal notation to the protocol field of the PPP packet. Although the details will be given later, as the NCP phase starts in response to a call operation from the terminal, an IPv6CP Configure Request packet notifying an operation under IPv6 is transmitted to PDSN. In the case of the terminal 150, the NCP phase unit 115 transmits/receives an NCP packet indicating an operation under IPv4 designated by setting 8021 in hexadecimal notation to the protocol field of the PPP packet. As the NCP phase starts in response to a call operation from the terminal, an IPCP Configure Request packet notifying an operation under IPv4 is transmitted to PDSN. The terminal having a dual stack structure capable of using both IPv4 and IPv6 such as the terminal 160 is equipped with two NCP phase units (only one unit is shown in FIG. 2) for separately processing IPv6 and IPv4. Since which one is to be used is determined by an operation by the caller, one of the units is selected and operated. It is obvious that the determined protocol may be set to the NCP phase unit at the start of a PPP connection process.

The protocol decision unit 113 has also a function of transferring a PPP packet to the IP processing unit 102 if the contents of the PPP packet are data (e.g., IP packet) not belonging to each phase process. The encapsulating unit 116 has also a function of encapsulating data received from the IP processing unit 102 and transferring the encapsulated data to the data transmission unit 117. Therefore, via the above-described routes, data such as Internet communication after the completion of PPP connection is transferred to the application processing unit 101 or radio processing unit 104.

FIG. 3 is a diagram showing an example of a functional structure of PDSN. PDSN 200 is constituted of: a provider side interface (IF) unit 201 being an interface with the provider network 500; a radio IF processing unit 202 for establishing a session prescribed for the mobile communication system of the provider network 500; a PPP processing unit 210 for executing a connection/disconnection process using PPP relative to the mobile station 100; an IP packet processing unit 205 for processing an IP packet transferred in PPP; and an IP side IF unit 206 being an interface for transferring an IP packet to the public IPv4 network 501 or public IPv6 network 502.

The PPP processing unit 210 is constituted of: a data reception unit 211 for receiving a PPP frame from the radio IF processing unit 202; a capsule development unit 212 for removing a data link capsule from a received PPP frame; a protocol decision unit 213 for transferring a PPP packet after capsule development to each phase; a control unit 219 for deciding an NCP phase unit to be made operable, in accordance with information (e.g., a protocol field value or the like) in an NCP packet used for decision by the protocol decision unit 213; an LCP phase unit 214 for executing an LCP process and an authentication process; a plurality of NCP phase units 215-1 to 215-n for executing an NCP process for each of a plurality of layer 3 protocols such as described earlier; an encapsulating unit 217 for encapsulating a PPP packet received from each phase process into a PPP frame; and a data transmission unit 218 for transmitting data to the radio IF processing unit 202. Similar to the mobile station side, although the LCP process and authentication process are executed collectively by the LCP phase unit 214, these processes may be assigned to different phase units. The protocol decision unit 213 has also a function of transferring a PPP packet to the IP processing unit 205 if the contents of the PPP packet is data (e.g., IP packet) not belonging to each phase process. The encapsulating unit 217 has also a function of encapsulating received from the IP processing unit 205 and transferring the encapsulated data to the data transmission unit 218.

Similar to the terminal, each functional block such as the PPP processing unit 210 and IP processing unit 205 is realized by an unrepresented processor (CPU) and software stored in a memory or the like. Some functions may be realized by hardware. All layer 3 protocols to be used at respective terminals are set to each functional block, and one of the layer 3 protocols is selected in the PPP process. Each functional block is driven by CPU and hardware to perform a device operation using PPP, such as a connection control, to allow packet communication between the terminal and PDSN. Each of the NCP phase units 215 is equipped with one of upper layer protocols (such as IPv4, IPv6 and Apple Talk) to be used by each terminal, to transmit/receive an NCP packet relative to a terminal by using the protocol of the mobile terminal. For example, 8057 in hexadecimal notation is set to the NCP #1 phase unit 215-1, 8021 in hexadecimal notation is set to the NCP #2 phase unit 215-2, and 8029 in hexadecimal notation is set to the NCP #3 phase unit 215-3, respectively corresponding to IPv6, IPv4 and Apple Talk to be used by terminals. The NCP phase is executed through transmission/reception of an NCP packet between the terminal and PDSN, the NCP packet having a value representative of the layer 3 protocol in its protocol field of the PPP packet. Although the details will be given later, the control unit 219 selects and operates one of the NCP phase units in accordance with a notice of the layer 3 protocol from the terminal.

With reference to the accompanying drawings, detailed description will be made on the operations of the terminal and PDSN and the communication system using mobile stations and PDSN, by taking as an example the terminal for IPv6 and PDSN using IPv4 and IPv6.

FIG. 4 is a diagram showing an example of the structure of a PPP packet. A PPP packet 813 is constituted of a Protocol field 814, a Code field 815, an ID field 816, a Length field 817, and an Option Data field 818, as prescribed in FRC1661. The top Protocol field 814 is a field to be used for distinguishing the type of the layer 3 protocol of the NCP packet. As described above, this field is set with 8057h (h represents hexadecimal notation) for IPv6, with 8021h for IPv4, and with 8029h for Apple Talk.

FIGS. 5A and 5B show examples of the structure of a PPP frame. Encapsulated PPP frames of HDLC-like framing are shown in FIGS. 5A and 5B. A PPP frame is constituted of a PPP packet 813 sandwiched between an HDLC header 811 including FLAG, ADDRESS and CONTROL fields and an HDLC footer 812 including FCS and FLAG fields. In the example shown in FIG. 5A, 8057h indicating that the layer 3 protocol is IPv6 is set to a protocol field 815 of a PPP packet 813, and a request signal (IPv6CP Configure Request) for request and notice to a communication partner is set to an option field 814. In the example shown in FIG. 5B, 8057h indicating that the layer 3 protocol is IPv6 is set to a protocol field 825 of a PPP packet 823, and a response signal (IPv6 Configure Ack) for a response to the request is set to an option field 824. A PPP frame having the structure of other specifications has also the structure that a PPP packet is sandwiched between a header and a footer prescribed in the other specifications.

FIG. 6 is a flow chart illustrating a signal transmission/reception and operations between the mobile station 100 and PDSN 200 of the communication system. FIG. 7 is a flow chart illustrating an example of the operations of PDSN, and FIG. 8 is a flow chart illustrating an example of the operations of a terminal. In the operation under PPP, the mobile station 100 and PDSN 200 operate in parallel for transmission/reception of a PPP packet to effect connection/disconnection therebetween. In the following, description will be made mainly on an operation of receiving an NCP packet of PPP from a terminal at PDSN, with reference to FIGS. 2 to 8.

(1) As a user issues a call request, the radio terminal 100 instructs the radio processing unit 104 (FIG. 2) to issue a radio session establishment request to thereby establish a radio session with PDSN 200 via the base station 400 and provider network 410 (170 in FIG. 6). On the side of PDSN 200, the radio IF processing unit 202 (FIG. 3) executes a radio session establishment process via the provider side IF unit 201 (FIG. 3).

(2) As the radio session establishment 150 is completed, a connection start instruction is sent to the LCP phase unit 214 (FIG. 3) of the PPP processing unit 210 (FIG. 3) of PDSN 200, and similarly a connection start request instruction is sent to the LCP phase unit 114 (FIG. 2) of the PPP processing unit 110 (FIG. 2) of the terminal 100. PPP connection starts therefore between the radio terminal 100 and PDSN 200.

More specifically, the LCP phase unit 214 of PDSN 200 generates an LCP link setting request packet, transmits the packet to the terminal 100 (701 in FIG. 6, 751 in FIG. 7), and executes an LCP phase process (such as link connection establishment) 700 and a user authentication process 800. As the scheduling unit 120 (FIG. 2) of the ratio terminal 100 issues an LCP start instruction, the LCP phase unit 114 generates an LCP link setting request packet, transmits the packet to PDSN 200 (702 in FIG. 6, 771 in FIG. 8), and executes the LCP phase process 700 and user authentication process 800 in cooperation with PDSN 200. As the LCP link establishment (700 to 704 in FIG. 6) and authentication process (800 in FIG. 6) are completed (752 in FIG. 7, 772 in FIG. 8) by cooperation between PDSN 200 and terminal 100 (752 in FIG. 7, 772 in FIG. 8), the LCP phase unit 114 of the terminal sends an LCP completion notice to the scheduling unit 120, and the scheduling unit 120 executes a transfer process (773 in FIG. 8) to the NCP phase. PDSN 200 waits for reception of an NCP packet from the terminal 100 (753 in FIG. 7).

In FIG. 8, processes (776, 777 in FIG. 8) shown in the right side exist after Step 773. This is because these processes show the operation of the terminal 160 having the dual stack structure capable of using both IPv6 and IPv4 described above. Also in this case, whether the terminal 160 uses either IPv6 or IPv4 is predetermined at the time of a call operation or by designation from the application processing unit 101 (FIG. 2). Therefore, at Step 773 one of the NCP phase units 115 is selected or the layer 3 protocol to be used is set to the NCP phase unit 115. For example, the NCP #1 phase process is selected for IPv6 to execute Steps 774 and 775 to be described later, and the NCP #n phase process is selected for IPv4 to execute Steps 776 and 777.

(3) As the phase is transferred to the NCP phase, the NCP phase unit 115 of the terminal 100 generates an NCP packet and transmits the packet to PDSN (774 in FIG. 8). Specifically, the NCP packet 813 is generated as the PPP packet in which 8057h indicating IPv6 is set to the protocol field 815 and IPv6CP Configure Request is set to the option field 814. The encapsulating unit 116 (FIG. 2) generates a PPP frame such as shown in FIG. 5A. The PPP frame 810 (FIG. 5A) is transmitted (601 in FIG. 6) to PDSN 200 via the data transmission unit 117 (FIG. 2) and radio processing unit 104 (FIG. 2).

(4) The operations described above correspond to the state (753 in FIG. 7) that PDSN 200 waits for an NCP packet reception from the terminal 100. After the PPP frame 810 is received via the provider side IF unit 201 (FIG. 3) and radio IF processing unit 202 (FIG. 3), the capsule development unit 212 (FIG. 3) of PDSN 200 removes the header 811 and footer 812 of the PPP frame 810 to extract the NCP packet 813. This NCP packet 813 is judged by the protocol processing unit 213 (FIG. 3) as a PPP packet for the NCP phase process (754 in FIG. 7). Information on the PPP packet is sent to the control unit 219 (FIG. 3). The control unit 219 judges that the NCP packet is received for the first time, selects the NCP phase unit 215 corresponding to the layer 3 protocol used by the communication partner terminal, and instructs a protocol designation unit 2191 of the control unit to start the NCP phase process (760 in FIG. 7). In this embodiment, since IPv6 is used, the NCP #1 phase unit 215-1 (FIG. 3) is selected to execute the NCP phase process for processing the received NCP packet 813 and PPP packets. A single NCP phase unit may be prepared to set information on the layer 3 protocol used by the terminal to the NCP phase unit at Step 760.

Upon reception of the operation start instruction from the control unit 219, the NCP #1 phase unit 215-1 generates an NCP packet and transmits the packet to the terminal 100 (775 in FIG. 7). Specifically, the NCP packet 813 is generated as the PPP packet in which 8057h indicating IPv6 is set to the protocol field 815 and IPv6CP Configure Request is set to the option field 814. The encapsulating unit 217 (FIG. 3) generates a PPP frame such as shown in FIG. 5A. The PPP frame 810 (FIG. 5A) is transmitted (1002 in FIG. 6) to the terminal 100 via the data transmission unit 218 (FIG. 3), radio processing unit 219 (FIG. 3) and provider side IF unit 201 (FIG. 3). Since the NCP #1 phase unit 215-1 has received IPv6CP Configure Request from the terminal 100 at Step 1001 shown in FIG. 6, the NCP packet 823 is generated as the PPP packet in which 8057h indicating IPv6 is set to the protocol field 825 and IPv6CP Configure Ack is set to the option field 824. The PPP frame such as shown in FIG. 5B is transmitted (1003 in FIG. 6) to the terminal 100 via the encapsulating unit 217, data transmission unit 218, radio IF processing unit 220 and provider side IF unit 201. In the connection operation under PPP, as described earlier, the PPP processing units 110 and 210 of the terminal 100 and PDSN 200 operate in parallel. Therefore, the transmission order of the PPP frames 810 and 820 to be transmitted from PDSN may be reversed (the order of Steps 1002 and 1003 may be exchanged) without any problem.

Similar to PDSN 200, upon reception of IPv6CP Configure Request 1002 from PDSN at Step 1002, the NCP phase unit 115 of the radio terminal 100 generates an NCP packet 820 as a PPP packet in which 8057h indicating IPv6 is set to the protocol field 825 and IPv6CP Configure Ack is set to the option field 824. The PPP frame 820 such as shown in FIG. 5B is transmitted (1004 in FIG. 6) to PDSN 200 via the encapsulating unit 116, data transmission unit 117 and radio processing unit 104.

As described above, as the terminal 100 transmits IPv6CP Configure Request and PDSN 200 receives IPv6CP Configure Ack, the NCP phase processes at the terminal and PDSN are completed (756 in FIG. 7, 775 in FIG. 8), and the PPP connection of the communication system is completed (759 in FIG. 7, 778 in FIG. 8). Thereafter, IP packets of IPv6 are transmitted/received between the terminal 100 and a contents server or the like provided by an unrepresented service provider or the like, via PDSN 200 and the public network 502, to thereby perform data communication such as transmission/reception of e-mails and access to the Internet.

As described above, PDSN 200 is equipped with the control unit 219 for controlling the NCP phase unit 215, and waits for an NCP start request packet from the terminal 100. Specifically, PDSN waits for an NCP link setting request packet from a communication partner (terminal 100), and until this request arrives, PDSN does not start the NCP phase process without selecting one of a plurality of NCP phase units. Namely, although a conventional system operates NCP phase units as many as a PDSN system allows, the control unit 219 controls not to transmit a connection start request to the NCP phase units, and thereafter the selected NCP phase unit is allowed to be operated. Therefore, the number of request packets to be transmitted from PDSN and the number of response packets from the terminal reduce, and the number of NCP phase processes using the unnecessary layer 3 protocol reduces in PDSN. A PPP connection time can therefore be shortened. In the above-described embodiment, a conventional system transmits/receives six NCP packets between the terminal and PDSN, whereas the system of the present invention transmits/receives four NCP packets because NCP packets for IPv4 will not be transmitted/received.

Selection of the NCP phase corresponding to the layer 3 protocol to be used by a terminal from a plurality of NCP phase units equipped in PDSN may be performed in the following manner. The control unit 219 is provided with a statistics processing unit 2192. All types of layer 3 protocols used after PPP connection completion are stored and statistically processed. This statistical process result is notified to the protocol designation unit 2191. After the authentication process, the NCP phase unit using a protocol having a high use frequency is selected and operated. FIG. 9 is a sequence diagram illustrating an example of the operation of a communication system operating by using the statistical process result.

The radio session establishment, LCP phase process and authentication process 800 are similar to those operations described above (170, 700 to 704, 800 in FIG. 9). After the authentication process is completed, PDSN 200 selects and operates the NCP phase unit using a protocol having a highest use frequency and designated by the protocol designation unit 2191, from all NCP phase units equipped in PDSN (1210 in FIG. 9). For example, if the communication system has a high use frequency of IPv6, the NCP #1 phase unit 215-1 (FIG. 3) is selected to start the NCP phase process.

More specifically, the NCP #1 phase unit 215-1 starts operating without waiting for IPv6CP Configure Request from the terminal 100, and similar to the operation described earlier, generates a PPP frame such as shown in FIG. 5A including a PPP packet and having 8057h representative of IPv6 set to the protocol field 815 and IPv6CP Configure Request set to the option field 814, and transmits the PPP frame to the terminal 100 (1202 in FIG. 9).

The mobile station 100 generates a PPP frame such as shown in FIG. 5A including a PPP packet and set with IPv6CP Configure Request, and transmits the PPP frame to the terminal 100 (1203 in FIG. 9).

In response to the IPv6CP Configure Request received at the terminal 100 and PDSN 200, a PPP frame such as shown in FIG. 5B including a PPP packet and set with IPv6CP Configure Ack is generated and transmitted to the partner device (1205, 1206 in FIG. 9). As both the devices receive IPv6CP Configure Ack, PPP connection allowing IPv6 network communication is completed to allow communication using IPv6 packets (1300 in FIG. 9).

As described above, PDSN starts PPP connection by designating (estimating) the protocol type having a high use frequency. It is therefore unnecessary to wait for a protocol notice from the terminal, and a PPP connection time can be shortened.

Although the description has been made in connection with the embodiments, the present invention is not limited only to the above embodiments. It will be apparent to those skilled in the art that other various alterations and modifications can be made without departing from the spirit of the present invention and the scope of claims.

Figure 1:
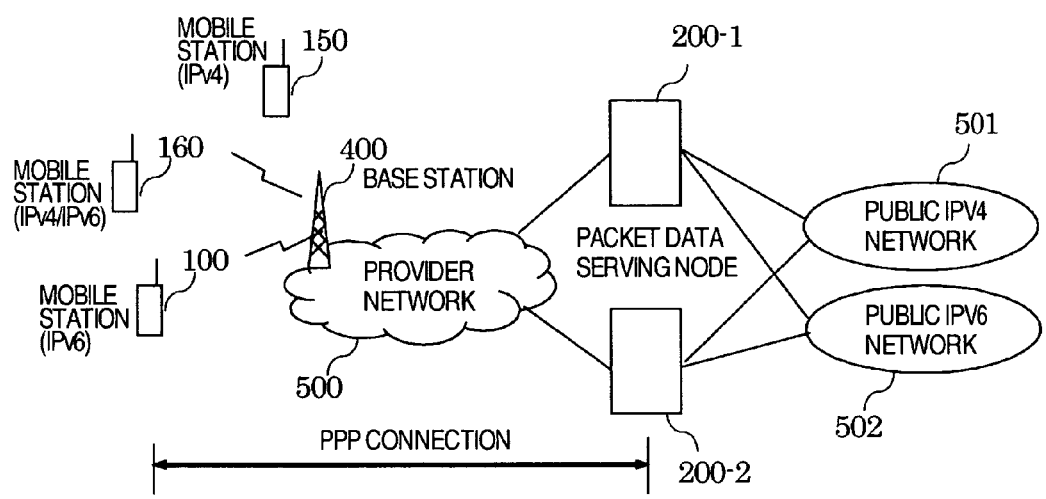
[FIG. 1] A diagram showing an example of a network configuration of a mobile communication system using communication terminal devices and packet data serving nodes.
Figure 2:
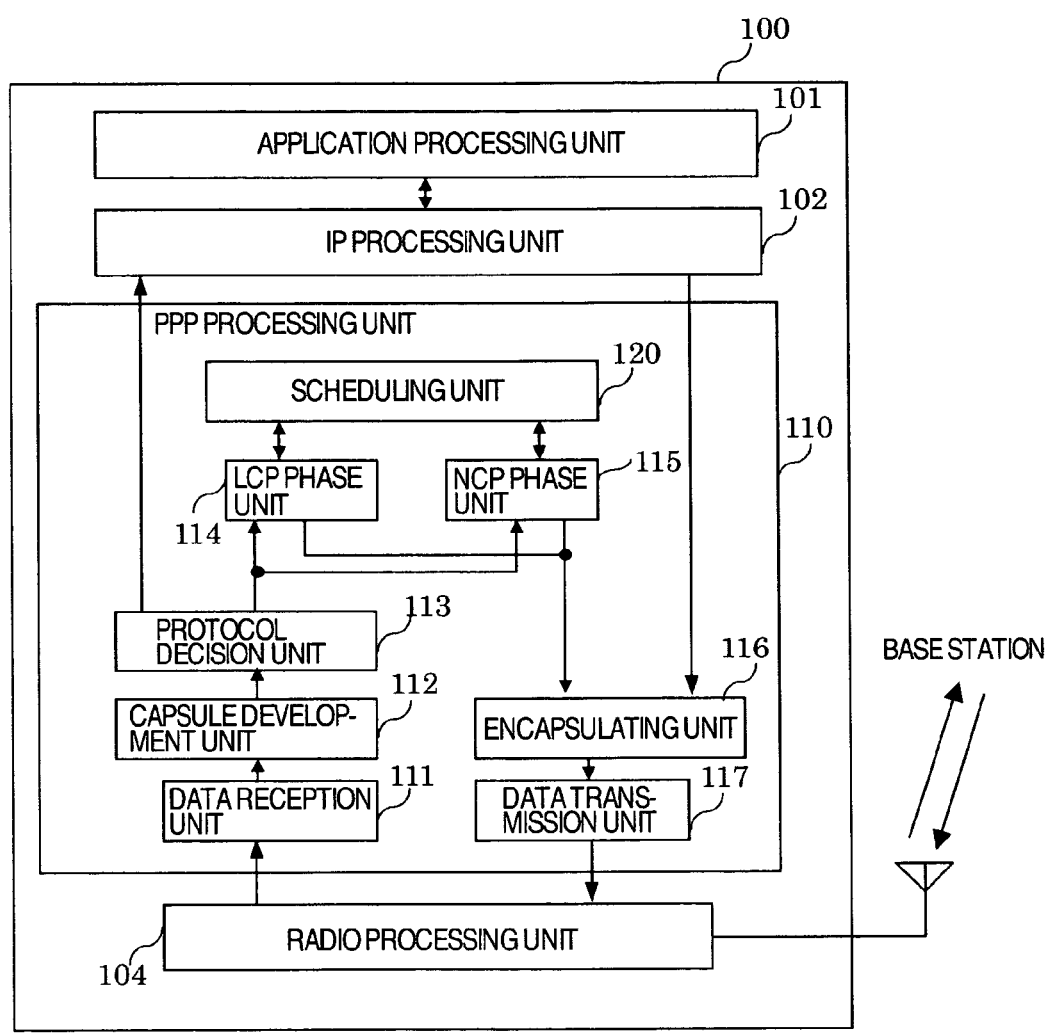
[FIG. 2] A diagram showing an example of the functional structure of a mobile station.
Figure 3:
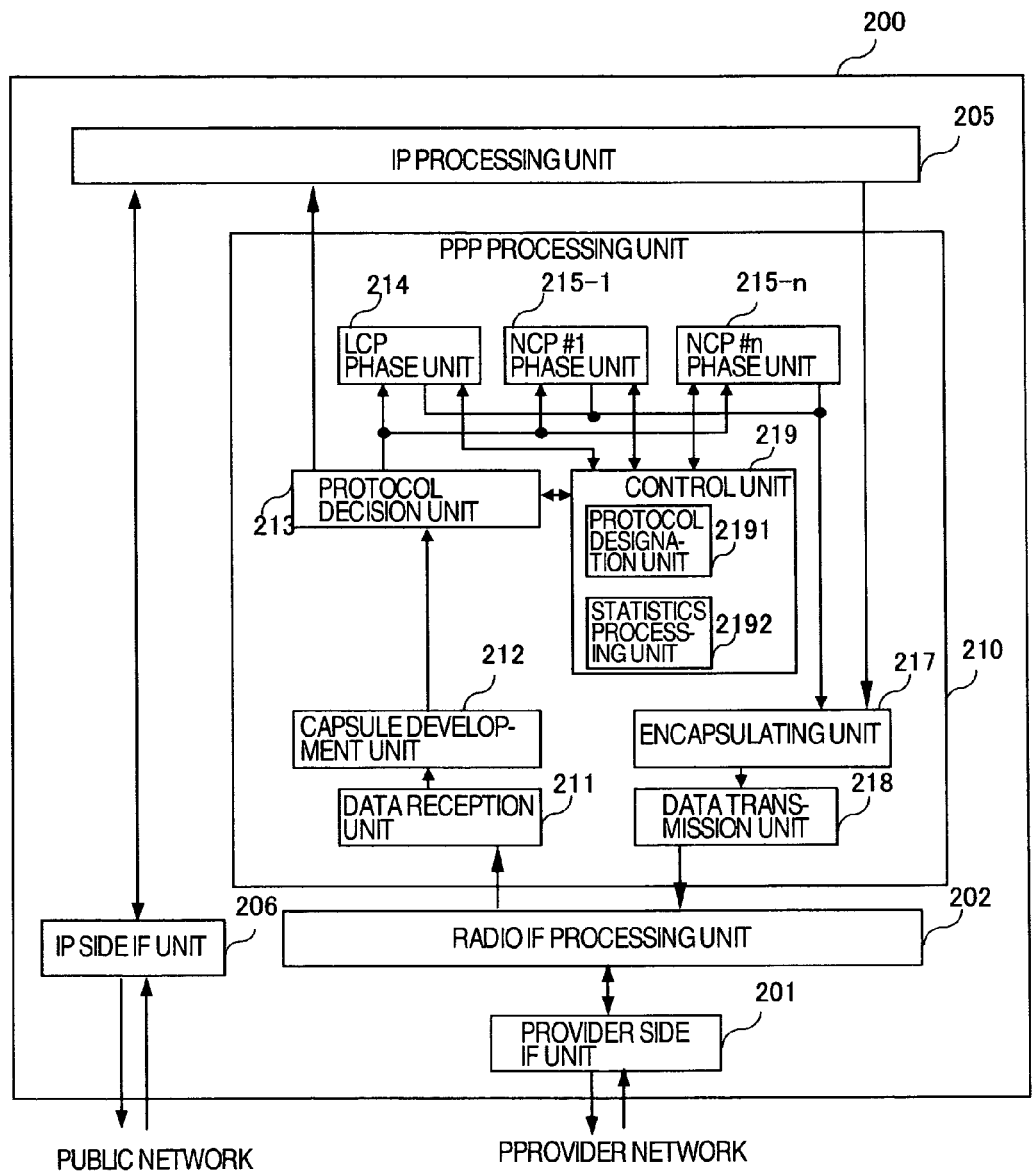
[FIG. 3] A diagram showing an example of the functional structure of a PDSN.
Figure 4:
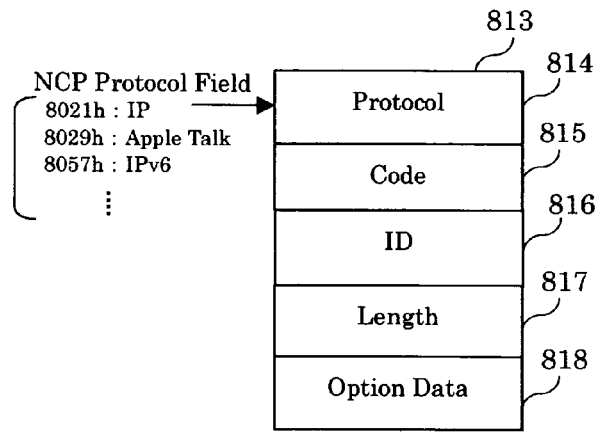
[FIG. 4] A diagram showing an example of the structure of a PPP packet.
Figure 5A:
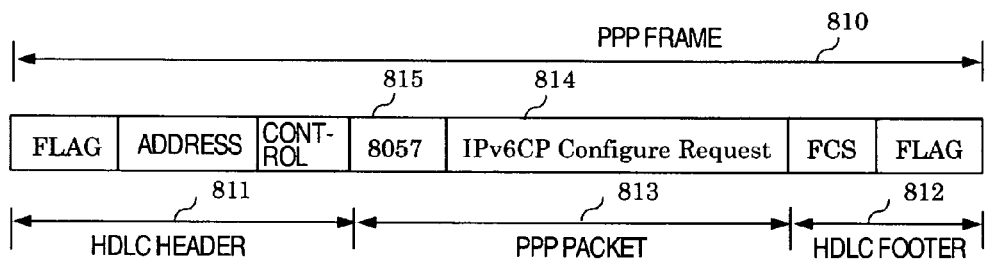
[FIG. 5A] A diagram showing an example of the structure of a PPP frame.
Figure 5B:
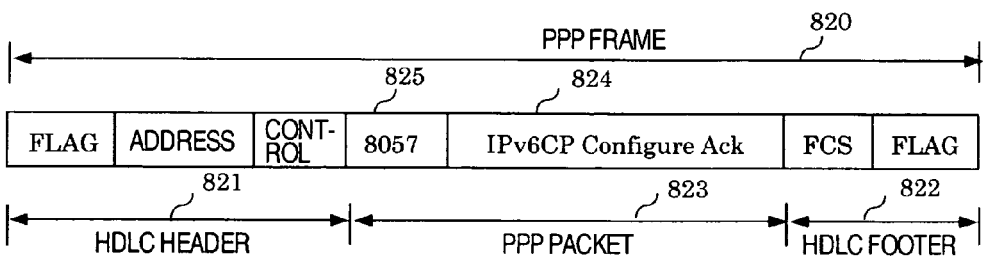
[FIG. 5B] A diagram showing an example of the structure of a PPP frame.
Figure 6:
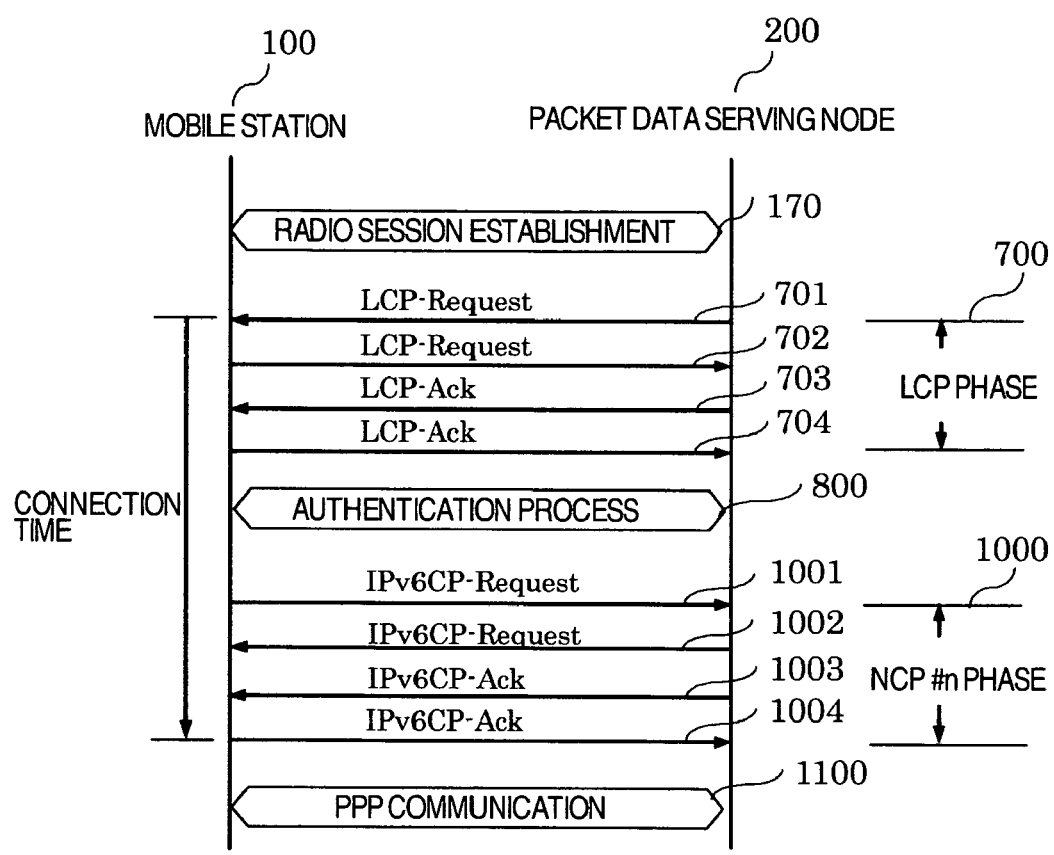
[FIG. 6] A sequence diagram showing an example of the operation of a communication system.
Figure 7:
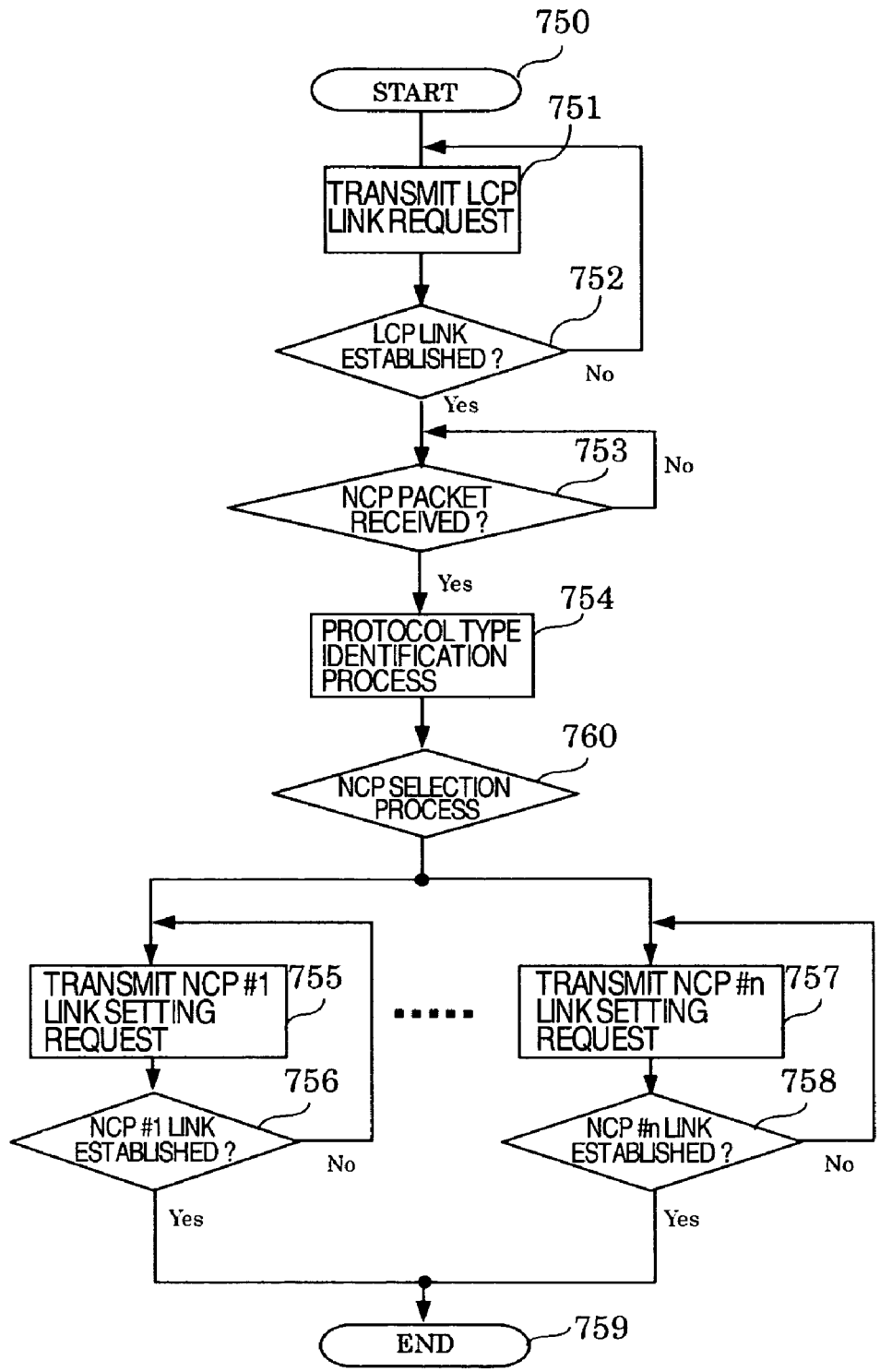
[FIG. 7] A flow chart illustrating an example of the operation of PDSN.
Figure 8:
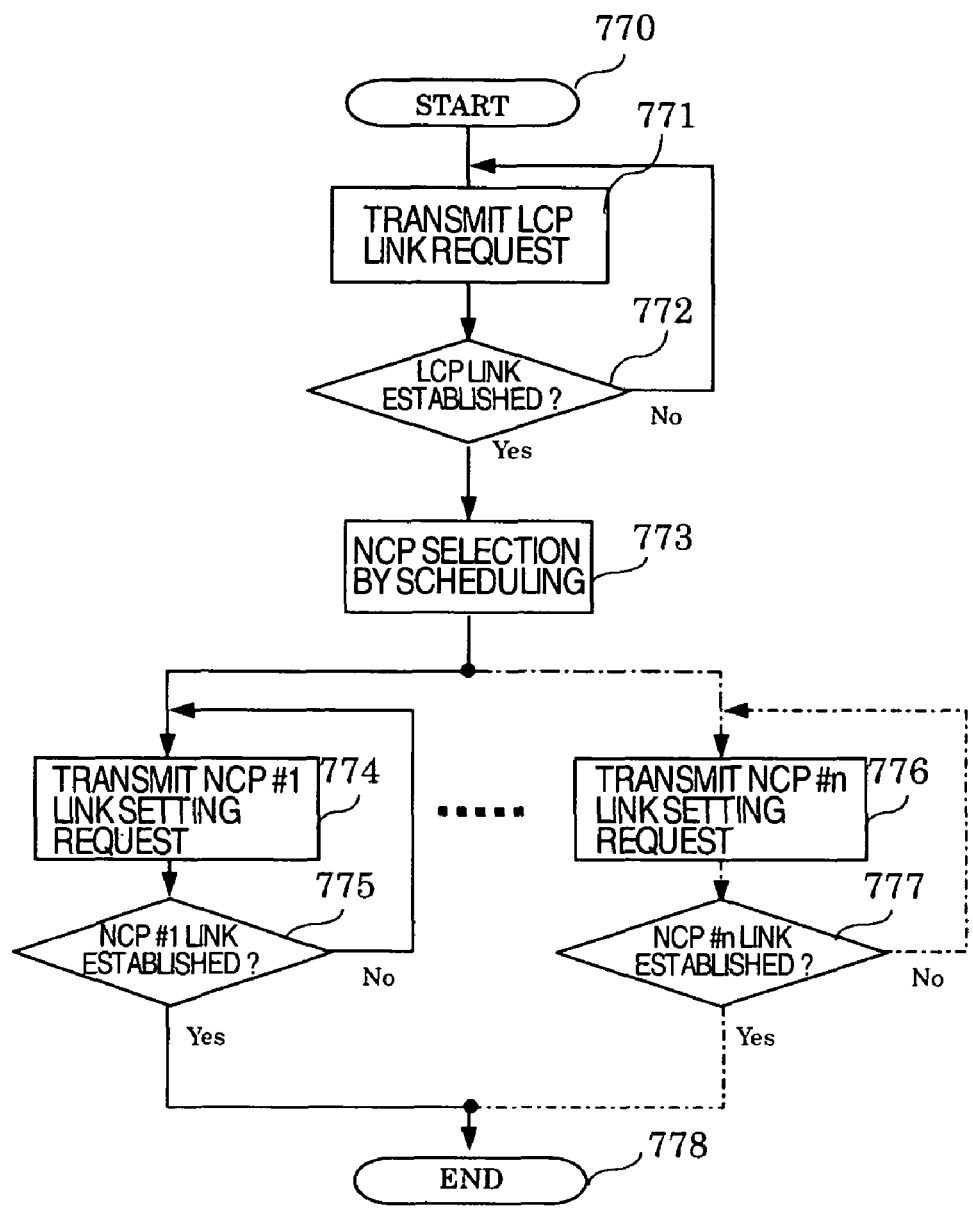
[FIG. 8] A flow chart illustrating an example of the operation of a terminal.
Figure 9:
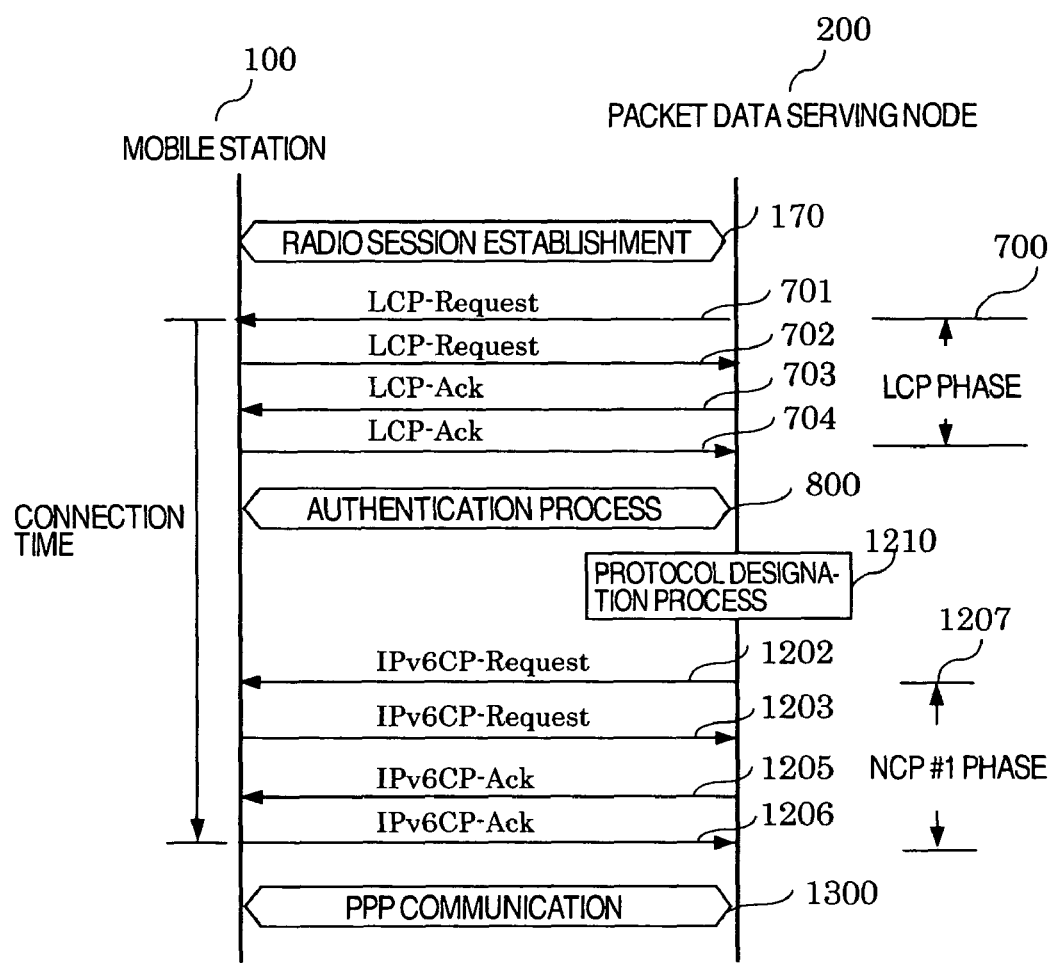
[FIG. 9] A flow chart illustrating another example of the operation of a communication system.

The invention claimed is:

1. A packet data serving node for connecting a communication terminal device to a public network by using Point to Point Protocol (PPP), the packet data serving node supporting a plurality of layer 3 protocol types, comprising:
   Link Control Protocol (LCP) phase processing means;
   Network Control Protocol (NCP) phase processing means;
   decision means for deciding a layer 3 protocol type of a reception PPP packet; and
   control means, wherein, when performing a PPP connection in a NCP phase after an LCP phase is completed, the control means controls the NCP phase processing means not to transmit any NCP start request message to the communication terminal device before receiving a NCP start request message from the communication terminal device,
   the decision means receives the NCP start request message from the communication terminal device, and refers to a protocol field in the received NCP start request message to decide the layer 3 protocol type used by the communication terminal device, and
   the control means controls the NCP phase processing means to transmit a NCP connection permission message set corresponding to the layer 3 protocol type decided by the decision means and a NCP start request message of the layer 3 protocol type decided by the decision means to the communication terminal device.

2. A packet data serving node for connecting a communication terminal device to a public network by using Point to Point Protocol (PPP), comprising:
   Link Control Protocol (LCP) phase processing means;
   a plurality of Network Control Protocol (NCP) phase processing means for supporting different layer 3 protocol types respectively;
   decision means for deciding a layer 3 protocol type of a reception PPP packet; and
   control means, wherein, when performing a PPP connection in a NCP phase after an LCP phase is completed, the control means controls the NCP phase processing means not to transmit any NCP start request message to the communication terminal device before receiving a NCP start request message from the communication terminal device,
   the decision means receives the NCP start request message from the communication terminal device, and refers to a protocol field in the received NCP start request message to decide the layer 3 protocol type used by the communication terminal device, and
   the control means selects one of said NCP phase processing means corresponding to the layer 3 protocol decided by the decision means, and makes said selected NCP phase processing means transmit a NCP connection permission message corresponding to the decided layer 3 protocol type and a NCP start request of the decided layer 3 protocol type destined to said communication terminal device.

3. A packet data serving node for connecting a communication terminal device to a public network by using Point to Point Protocol (PPP), the packet data serving node supporting a plurality of layer 3 protocol types, comprising:
   Link Control Protocol (LCP) phase processing means;
   Network Control Protocol (NCP) phase processing means;
   decision means for deciding a layer 3 protocol type of a reception PPP packet; and
   control means, wherein, when performing a PPP connection in a NCP phase after an LCP phase is completed, the control means controls the NCP phase processing means not to transmit any NCP start request message to the communication terminal device before receiving a NCP start request message from the communication terminal device,
   the decision means receives the NCP start request message from the communication terminal device, and refers to a protocol field in the received NCP start request message to decide the layer 3 protocol type used by the communication terminal device, and
   the control means sets a layer 3 protocol type decided by the decision to said NCP phase processing means, and makes said NCP phase processing means transmit an NCP connection permission message of the decided layer 3 protocol type and an NCP start request message of the decided layer 3 protocol type destined to said communication terminal device.

4. A packet data serving node for connecting a communication terminal device to a public network by using Point to Point Protocol (PPP), the packet data serving node supporting a plurality of layer 3 protocol types, comprising:
   Link Control Protocol (LCP) phase processing means;
   a plurality of Network Control Protocol (NCP) phase processing means;
   decision means for deciding a layer 3 protocol type of a reception PPP packet;
   statistics processing means for statistically processing a type of a layer 3 protocol used for PPP connection completion; and
   control means,
   wherein, when performing a PPP connection in a NCP phase after a LCP phase is completed, the control means selects said NCP phase processing means for a layer 3 protocol having a highest use frequency based on a statistics processing result by said statistics processing means, and makes said NCP phase processing means transmit an NCP start request message destined to said communication terminal device.

5. A communication method for a communication system using Point to Point Protocol (PPP) wherein:
when performing a PPP connection in a Network Control Protocol (NCP) phase after a Link Control Protocol (LCP) phase process is completed between a terminal device and a packet data serving node,
said packet data serving node does not transmit any NCP start request message to said terminal device before receiving a NCP start request message from said terminal device, starts a NCP phase upon receipt of the NCP start request message from said terminal device, and transmits an NCP connection permission message and an NCP start request message corresponding to a layer 3 protocol notified from said terminal device to said terminal device.

6. A communication connection apparatus for connecting a communication terminal to a public network by using Point to Point Protocol (PPP) via a provider network, the communication connection apparatus supporting a plurality of layer 3 protocol types, comprising:
a reception unit which receives packets from the communication terminal via an interface of the provider network; and
a transmission unit which transmits packets to the communication terminal via the interface of the provide network;
a control unit,
wherein, when performing a PPP connection in a Network Control Protocol (NCP) process after a Link Control Protocol (LCP) process and an authentication process are completed, the control unit does not transmit any NCP start request packet to the communication terminal before receiving a NCP start request packet from the communication terminal,
when the reception unit receives the NCP start request packet from the communication terminal, the control unit decides a NCP layer 3 protocol type of a received packet based on layer 3 protocol type identification information in a field of the NCP start request packet received by the reception unit, and controls the transmission unit to transmit a NCP connection permission packet corresponding to the decided aver 3 protocol type and a NCP start request packet of the decided layer 3 protocol type to the communication terminal.

7. A communication connection apparatus for connecting a communication terminal to a public network by using Point to Point Protocol (PPP) via a provider network, comprising:
a reception unit which receives packets from the communication terminal via an interface of the provider network;
a transmission unit which transmits packets to the communication terminal via the interface of the provider network;
a statistic processing unit which statistically process types of layer 3 protocols used in PPP; and,
a control unit,
wherein, in a Network Control Protocol (NCP) occurring after completing a Link Control Protocol (LCP) process and an authentication process, the control unit decides a type of layer 3 protocol to be used for the communication with the communication terminal based on a statistics processing result performed by the statistics processing unit, and transmits a NCP start request packet of the decided layer 3 protocol type from the transmission unit,
wherein when the reception unit receives a NCP start request packet of the decided layer 3 protocol from the communication terminal,
a control unit controls the transmission unit to transmit a connection permission packet of the decided layer 3 protocol to the source communication terminal of the NCP start request packet.

* * * * *